(12) United States Patent
Ishiguro et al.

(10) Patent No.: US 10,174,786 B2
(45) Date of Patent: Jan. 8, 2019

(54) WHEEL BEARING APPARATUS AND ITS MOUNTING STRUCTURE

(71) Applicant: NTN Corporation, Osaka-shi (JP)

(72) Inventors: Hisao Ishiguro, Iwata (JP); Yasuhiro Aritake, Iwata (JP); Kazunari Yamamoto, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/619,642

(22) Filed: Jun. 12, 2017

(65) Prior Publication Data
US 2017/0276172 A1    Sep. 28, 2017

Related U.S. Application Data (63) Continuation of application No. PCT/JP2015/084511, filed on Dec. 9, 2015.

(30) Foreign Application Priority Data

Dec. 10, 2014    (JP) .................................. 2014-250086

(51) Int. Cl.
*F16C 19/18*    (2006.01)
*F16C 33/58*    (2006.01)
(Continued)

(52) U.S. Cl.
CPC ........ *F16C 19/186* (2013.01); *B60B 27/0005* (2013.01); *B60B 35/14* (2013.01);
(Continued)

(58) Field of Classification Search
CPC .......... F16C 19/08; F16C 19/18; F16C 33/58; F16C 35/067; F16C 2226/60; F16C 2326/02; F16C 35/18; B60B 35/14; B60B 27/0005

USPC ....... 384/428, 537, 542, 544, 559, 564, 585, 384/589; 464/178; 29/898.04, 898.066, 29/898.07; 451/51
See application file for complete search history.

(56) References Cited

U.S. PATENT DOCUMENTS 4,408,809 A * 10/1983 Walter ................ B60B 27/0005
                                                        384/486
4,749,288 A *  6/1988 Tilch ..................... F16C 19/386
                                                        384/428
(Continued)

FOREIGN PATENT DOCUMENTS

EP           1671812 A2 *  6/2006  ............. B60B 27/00
JP       2008241359 A  * 10/2008
(Continued)

*Primary Examiner* — Marcus Charles
(74) *Attorney, Agent, or Firm* — Harness, Dickey & Pierce, P.L.C.

(57) ABSTRACT

A wheel bearing apparatus has an outer member with a body mounting flange and double row outer raceway surfaces, an inner member with double row inner raceway surfaces opposing the double row outer raceway surfaces, and double row rolling elements contained between the inner raceway surfaces and the outer raceway surfaces, respectively, of the inner member and the outer member. A plurality of bolt insertion holes formed in the outer member body mounting flange. An abutment surface, to abut against the body-side member, is formed around each bolt insertion hole as a surface projecting from the inner-side surface of the body mounting flange with a step height. A relative difference between the step heights of the abutment surfaces is limited to a minimum.

8 Claims, 11 Drawing Sheets

(51) Int. Cl.
  *B60B 35/14* (2006.01)
  *B60B 27/00* (2006.01)
  *F16C 35/067* (2006.01)
  *B60B 35/18* (2006.01)

(52) U.S. Cl.
  CPC ............ *F16C 33/581* (2013.01); *B60B 35/18* (2013.01); *F16C 19/18* (2013.01); *F16C 33/58* (2013.01); *F16C 35/067* (2013.01); *F16C 2226/60* (2013.01); *F16C 2326/02* (2013.01)

(56) References Cited

U.S. PATENT DOCUMENTS

| | | | |
|---|---|---|---|
| 5,762,559 A * | 6/1998 | Jacob | B60B 27/0005 384/544 |
| 6,575,637 B1 * | 6/2003 | Tajima | B60B 27/00 384/544 |
| 6,579,156 B2 * | 6/2003 | Sugino | B24B 1/00 29/898.066 |
| 7,226,344 B2 * | 6/2007 | Fukao | B24B 7/17 29/898.06 |
| 7,470,067 B2 * | 12/2008 | Meeker | B60B 27/00 384/544 |

FOREIGN PATENT DOCUMENTS

| | | | | |
|---|---|---|---|---|
| JP | 2009-292370 | | 12/2009 | |
| JP | 2011073540 A | * | 4/2011 | |
| JP | 2012-228909 | | 11/2012 | |
| JP | 2013-223869 | | 10/2013 | |
| WO | WO-2009037823 A1 | * | 3/2009 | ............ F16C 19/186 |

\* cited by examiner

$\delta \geqq 0.03\,mm$

Fig. 3(c)

$\delta \geqq 0.03\,mm$

Fig. 6(a)
Roundness of inner-side outer raceway surface
(before mounting of suspension)

Fig. 6(b)
Roundness of inner-side outer raceway surface
(after mounting of suspension $\alpha$)

Fig. 6(c)
Roundness of inner-side outer raceway surface
(after mounting of suspension $\beta$)

Fig. 7(a)

Roundness of outer-side outer raceway surface (before mounting of suspension)

Fig. 7(b)

Roundness of outer-side outer raceway surface (after mounting of suspension α)

Fig. 7(c)

Roundness of outer-side outer raceway surface (after mounting of suspension β)

PRIOR ART

Fig. 12

PRIOR ART

Fig. 13(a)

PRIOR ART

Fig. 13(b)

WHEEL BEARING APPARATUS AND ITS MOUNTING STRUCTURE

CROSS-REFERENCE TO RELATED APPLICATIONS

This application is a continuation of International Application No. PCT/JP2015/084511, filed Dec. 9, 2015, which claims priority to Japanese Application No. 2014-250086, filed Dec. 10, 2014. The disclosures of the above applications are incorporating herein by reference.

FIELD

The present disclosure generally relates to a wheel bearing apparatus that rotationally bears a wheel of a vehicle, such as an automobile. More particularly, the disclosure relates to a wheel bearing apparatus and its mounting structure that assures the accuracy and long service-life of the wheel bearing apparatus while suppressing stress generated in an outer member of the wheel bearing apparatus.

BACKGROUND

The wheel bearing apparatus is used to rotationally bear a wheel of a vehicle and roughly classified to a driving wheel use and a driven wheel use. In general, due to structural reasons of the wheel bearing apparatus, the inner ring rotation type is adopted for the driving wheel bearing apparatus and both the inner ring rotation type and the outer ring rotation type are adopted for the driven wheel bearing apparatus. In general, the double row angular contact ball bearings with low rotational torque features are used for many uses. Some of the reasons are that they have a desirable bearing rigidity, exhibit excellent durability against misalignment from the point of view of fuel consumption. In the double row angular contact ball bearing, a plurality of balls is interposed between a stator ring and a rotational ring. The balls contact the rings while the rings apply a predetermined contact angle onto the balls.

In the wheel bearing apparatus with the double row rolling bearing, it has become desirable in recent years to improve fuel consumption for resource savings or antipollution. Especially, it is important to reduce the weight of the wheel bearing apparatus while keeping both its strength and rigidity. To solve such a problem, an outer member (stator ring) of the wheel bearing apparatus shown in FIG. 11 has been proposed.

Figure 11A:
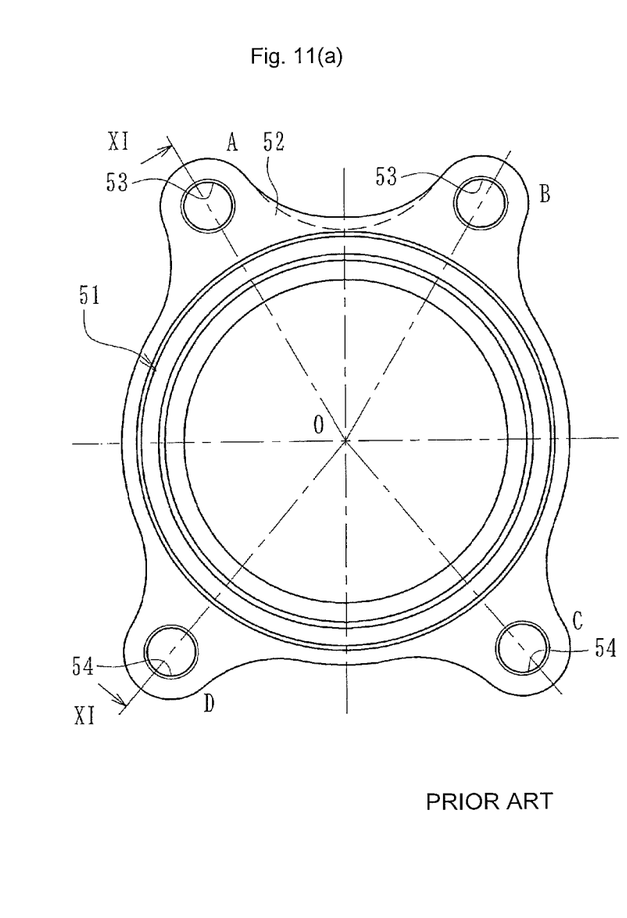
FIG. 11(a) is a side elevation view of a prior art outer member of a wheel bearing apparatus.
Figure 11B:
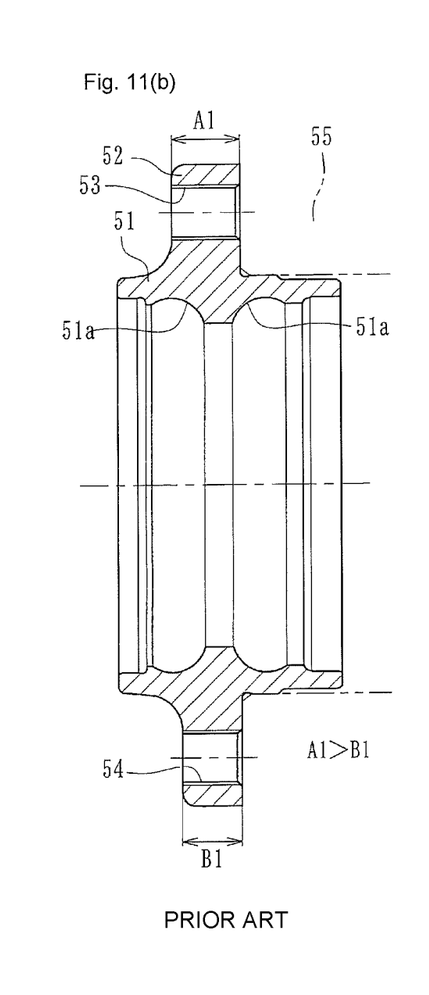
FIG. 11(b) is a longitudinal section view taken along a line XI-O-XI of FIG. 11(a).

In this wheel bearing apparatus, strength and rigidity are improved by modifying the configurations or dimensions of only a weakest part of an outer member 51. The weakest part is determined by previously obtaining stresses generated in parts of a body mounting flange 52 by an FEM analysis when a moment load is applied to the outer member 51. That is, four bolt insertion holes 53, 54 are formed on the body mounting flange 52. The thickness of peripheral portions A, B of an upper side, a side opposite to a road surface, and the thickness of peripheral portions C, D of a lower side, road surface sides, is differentiated. More particularly, a thickness A1 of the peripheral portions A, B of the upper side, where a load is applied so as to separate the peripheral portions A, B from a knuckle 55 (shown by a two-dot chain line), is larger than the thickness B1 of the peripheral portions C, D of the lower side, where a load is applied so as to push the peripheral portions C, D toward the knuckle 55 as shown in FIG. 11(b).

This makes it possible to provide a wheel bearing apparatus with a long service-life that satisfies the contradictory problems. It balances them at high level since the body mounting flange 52 is formed so that only the part required for the strength and rigidity is thickened and the other part is thinned. See, JP2009-292370 A.

In such a wheel bearing apparatus, the roundness of outer raceway surfaces 51a, 51a of the outer member 51, after mounting of the wheel bearing apparatus, is largely influenced by the thickness of the knuckle 55. That is, the outer raceway surface 51a, especially one near the knuckle is largely influenced by the knuckle55when the thickness of the knuckle55is larger than the thickness A1 of the outer member body mounting flange 52. Accordingly, if the contact state of abutment surfaces, such as a configuration or contact area of the abutment surfaces, is not good, deterioration of the roundness of the outer raceway surfaces may not be prevented by taking measures only on the bearing portion.

Figure 12:
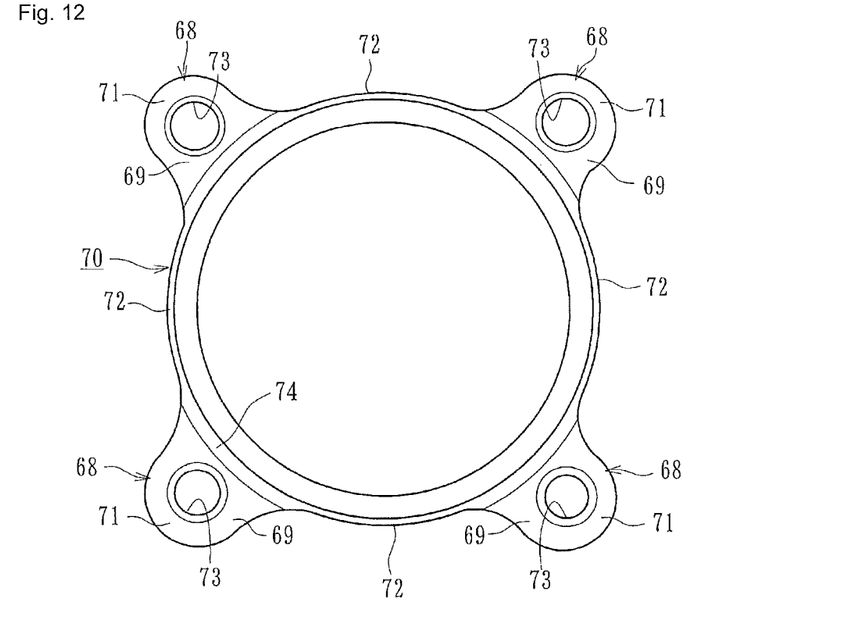
FIG. 12 is a side elevation view of a prior art outer member of a wheel bearing apparatus.

Corresponding to the circumstances, a wheel bearing apparatus is known that prevents the outer raceway surface of the outer member from being influenced by strain, tensile stress, caused by uneven contact between the stator flange of the outer member and the knuckle. As shown in FIG. 12, the wheel bearing apparatus has a body mounting flange 68 of a noncircular configuration. Larger diameter portions 71 and smaller diameter portions 72 are alternately arranged along a circumference of an outer member 70.Mounting holes 73 are formed in the larger diameter portions 71. As shown in FIG. 13, circularly continued recessed grooves 74 are formed on base-end side portions, radially inner-side portions, of an inner-side surface 69, surface to be faced to a knuckle 75, of the larger and smaller diameter portions 71, 72. A radially outer-side edge of the recessed groove 74, formed on the larger diameter portions 71, is positioned at the same or a radially outer position of the radially outer-side edge of the recessed groove 74 formed on the smaller diameter portion 72.

Figures 13A, 13B:
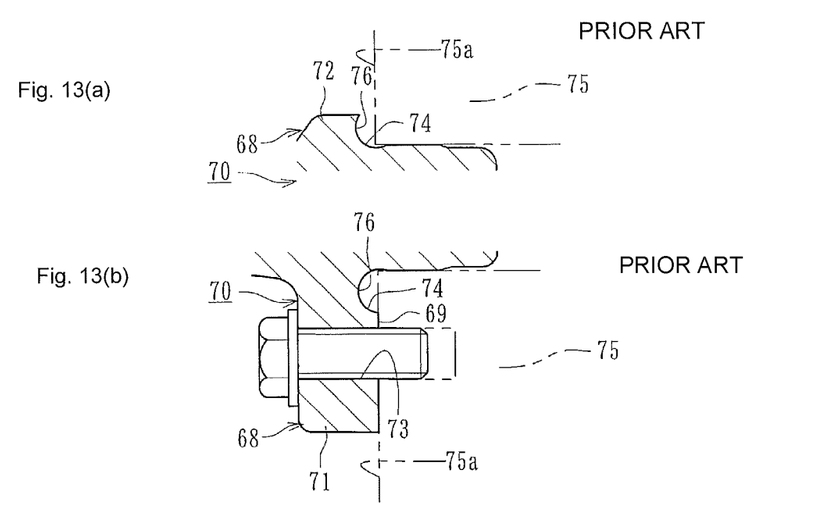
FIG. 13(a) is a partially enlarged view of the smaller diameter portion of the outer member of FIG. 12.
FIG. 13(b) is a partially enlarged view of the larger diameter portion of the outer member of FIG. 12.

As shown in FIGS. 13(a) and 13(b), each of the recessed grooves 74is formed to have a configuration recessed toward a direction apart from an outer-side surface 75a of the knuckle 75, the left in FIG. 13. The deepest portions 76 of the recessed grooves 74 exist in both the larger and smaller diameter portions 71, 72.

Under the circumstances, the inner-side surface 69 of the body mounting flange 68 and the outer-side surface 75a of the knuckle 75 contact each other at portions other than the recessed grooves 74. That is, since the recessed groove 74 is also formed on the inner-side surface of the smaller diameter portion 72, the smaller diameter portion 72 does not contact the outer-side surface 75a of the knuckle 75. Only portions around the mounting holes 73 of the larger diameter portions 71 contact the outer-side surface 75a of the knuckle 75. Accordingly, it is possible to reduce the contact area between the body mounting flange 68 and the knuckle 75. Thus, it is possible to reduce the degree of influence on the accuracy of the outer member 70 even if the finishing accuracy of the outer-side surface 75a of the knuckle 75 is not good.

In addition, the recessed groove 74 formed on the base of the body mounting flange 68 is more easily elastically deformable than other portions of the body mounting flange 68. Thus, it is possible to absorb the strain of the body mounting flange 68 even when strain is caused by uneven contact condition between the inner-side surface 69of the body mounting flange 68 and the outer-side surface 75a of the knuckle 75.Thus, it is possible to prevent the outer member outer raceway surfaces, not shown, configuration accuracy, including roundness, from being adversely affected. See, JP2012-228909 A.

However, in the prior art wheel bearing apparatus, the recessed grooves 74 are insufficient to prevent the roundness of the outer member outer raceway surfaces from being adversely affected. This is due to the flatness of turning machined abutment surface of the knuckle 75a being inferior, and that the strength and durability of the body mounting flange 68, itself, would be degraded by the recessed grooves 74 formed on the inner-side surface 69 of the body mounting flange 68.

SUMMARY

It is, therefore, an object of the present disclosure to provide a wheel bearing apparatus and mounting structure that improves accuracy and service life after mounting of the wheel bearing apparatus given the configuration accuracy of the outer member. This is accomplished by suppressing adverse influences of the flatness of the abutment surface against the mating member, the knuckle. Also, it is enhanced by suppressing adverse effects of the deformation of the body mounting flange on the roundness of the outer member outer raceway surfaces while reducing the contact area of the abutment surfaces between the body mounting flange and the knuckle and improving flatness of the abutment surfaces.

To achieve the above objects, a wheel bearing apparatus comprises an outer member integrally formed with a body mounting flange on its outer circumference. The flange is to be mounted on a body-side member of a vehicle. The outer member inner circumference includes double row outer raceway surfaces. Double row inner raceway surfaces, opposing the double row outer raceway surfaces, are formed on an inner member outer circumference. Double row rolling elements are contained between the inner raceway surfaces and the outer raceway surfaces, respectively, of the inner member and the outer member. A plurality of bolt insertion holes are formed in the outer member body mounting flange. An abutment surface, to abut against the body-side member, is formed around each bolt insertion hole. The abutment surface is a surface projecting from the inner-side surface of the body mounting flange with a step height. A relative difference between the step heights of the abutment surfaces is limited to a minimum.

The wheel bearing apparatus comprises an outer member integrally formed with a body mounting flange. A plurality of bolt insertion holes are formed in the outer member body mounting flange. An abutment surface, to abut against the body-side member, is formed around each bolt insertion hole as a surface projecting from the inner-side surface of the body mounting flange with a step height. A relative difference between the step heights of the abutment surfaces is limited to a minimum. Thus, it is possible to provide a wheel bearing apparatus that improves accuracy and service life by suppressing adverse influences of the flatness of the abutment surface against the mating member (body-side member e.g. knuckle), after mounting of the wheel bearing apparatus given configuration accuracy of the outer member. Also, accuracy and service life are improved by suppressing adverse effects of the deformation of the body mounting flange on the roundness of the outer member outer raceway surfaces while reducing the contact area of the abutment surfaces between the body mounting flange and the knuckle and improving the flatness of the abutment surfaces.

A mounting structure for a wheel bearing apparatus comprises an outer member integrally formed with a body mounting flange on its outer circumference. The flange is to be mounted on a body-side member of a vehicle. The outer member inner circumference includes double row outer raceway surfaces. Double row inner raceway surfaces, opposing the double row outer raceway surfaces, are formed on an outer circumference of an inner member. Double row rolling elements are contained between the inner raceway surfaces and the outer raceway surfaces, respectively, of the inner member and the outer member. A mounting member is interposed between the body mounting flange of the outer member and the body-side member. A plurality of bolt insertion holes are formed in the outer member body mounting flange. A plurality of bolt insertion holes are formed in the mounting member. An abutment surface to abut against the body mounting flange is formed around each bolt insertion hole of the mounting member. The abutment surface projects from the outer-side surface of the mounting member with a step height. Relative difference between the step heights of the abutment surfaces is limited to a minimum.

The mounting structure for a wheel bearing apparatus comprises an outer member integrally formed with a body mounting flange to be secured on the body-side member. A plurality of bolt insertion holes are formed in the outer member body mounting flange. A plurality of bolt insertion holes are formed in the mounting member. An abutment surface, to abut against the body mounting flange, is formed around each bolt insertion hole of the mounting member as a surface projecting from the outer-side surface of the mounting member with a step height. Relative difference between the step heights of the abutment surfaces is limited to a minimum. Thus, it is possible to provide a mounting structure for a wheel bearing apparatus that improves accuracy and service life by suppressing adverse influences of the flatness of the abutment surface against the mating member (e.g. knuckle), after mounting of the wheel bearing apparatus given the configuration accuracy of the outer member, and also by suppressing adverse effects of the deformation of the body mounting flange on the roundness of the outer member outer raceway surfaces while reducing the contact area of the abutment surfaces between the body mounting flange and the knuckle and improving the flatness of the abutment surfaces.

The inner diameter of the abutment surface is an opening diameter of the bolt insertion hole. The outer diameter of the abutment surface is set to 1.4 to 1.7 times the outer diameter of a fastening bolt. This prevents the contact area of the abutment surface of the body mounting flange from being too small and thus the abutment surface pressure from being too high to effectively suppress the deformation of the outer member after mounting.

The step height of the abutment surface is set to 0.03 mm or more. This prevents the step height from being deformed and extinguished even when the fastening bolts are fastened by a predetermined fastening torque.

The relative difference between the step heights of the abutment surfaces is limited to 80 μm or less. This suppresses adverse influence of the flatness of a body-side member and thus suppresses the deformation of the outer member after mounting of the wheel bearing apparatus.

The step heights of the abutment surface are formed by machining after heat treatment. This corrects deformation caused by heat treatment and thus limits the relative difference between the step heights of the abutment surfaces.

An outer member is integrally formed, on its outer circumference, with a body mounting flange, to be mounted on a body-side member of a vehicle. The outer member inner circumference includes double row outer raceway surfaces. An inner member includes, on its outer circumferences, double row inner raceway surfaces that oppose the double row outer raceway surfaces. Double row rolling elements are contained between the inner raceway surfaces and the outer raceway surfaces, respectively, of the inner member and the outer member. A plurality of bolt insertion holes are formed in the body mounting flange of the outer member. An abutment surface, to abut against the body-side member, is formed around each bolt insertion hole as a surface projecting from the inner-side surface of the body mounting flange with a step height. A relative difference between the step heights of the abutment surfaces is limited to a minimum. Thus, it is possible to provide a wheel bearing apparatus that improves accuracy and service life by suppressing adverse influences of the flatness of the abutment surface against the mating member (e.g. knuckle), after mounting of the wheel bearing apparatus given the configuration accuracy of the outer member. Also, accuracy and service life are improved by suppressing adverse effects of the deformation of the body mounting flange on the roundness of the outer member outer raceway surfaces while reducing the contact area of the abutment surfaces between the body mounting flange and the knuckle and improving the flatness of the abutment surfaces.

In addition, an outer member integrally includes a body mounting flange to be secured on the body-side member. A plurality of bolt insertion holes are formed in the outer member body mounting flange. A plurality of bolt insertion holes are formed in the mounting member. An abutment surface, to abut against the body mounting flange, is formed around each bolt insertion hole of the mounting member as a surface projecting from the outer-side surface of the mounting member with a step height. Relative difference between the step heights of the abutment surfaces is limited to a minimum. Thus, it is possible to provide a mounting structure for a wheel bearing apparatus that improves accuracy and service life by suppressing adverse influences of the flatness of the abutment surface against the mating member (e.g. knuckle), after mounting of the wheel bearing apparatus given the configuration accuracy of the outer member. Also, the accuracy and service life are improved by suppressing adverse effects of the deformation of the body mounting flange on the roundness of the outer raceway surfaces of the outer member while reducing the contact area of the abutment surfaces between the body mounting flange and the knuckle and improving the flatness of the abutment surfaces.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

A wheel bearing apparatus comprises an outer member integrally formed, on its outer circumference, with a body mounting flange to be mounted on a body-side member of a vehicle. The outer member inner circumference includes double row outer raceway surfaces. An inner member includes a wheel hub and an inner ring. The wheel hub is integrally formed, on its one end, with a wheel mounting flange. The wheel hub outer circumferences include an inner raceway surface opposing one of the double row outer raceway surfaces. A cylindrical portion axially extends from the inner raceway surface. The inner ring is press fit onto the cylindrical portion of the wheel hub. The inner ring outer circumference includes an inner raceway surface opposing the other of the double row outer raceway surfaces. Double row rolling elements are contained between the outer raceway surfaces and inner raceway surfaces, respectively, of the outer member and the inner member. A plurality of bolt insertion holes are formed in the body mounting flange of the outer member. An abutment surface, to abut against a body-side member, is formed around each bolt insertion hole. The surface projects from the inner-side surface of the body mounting flange with a step height. The inner diameter of the abutment surface is an opening diameter of the bolt insertion hole. The outer diameter of the abutment surface is set to 1.4 to 1.7 times the outer diameter of a fastening bolt. The step height of the abutment surface is set to 0.03 mm or more.

Figure 1:
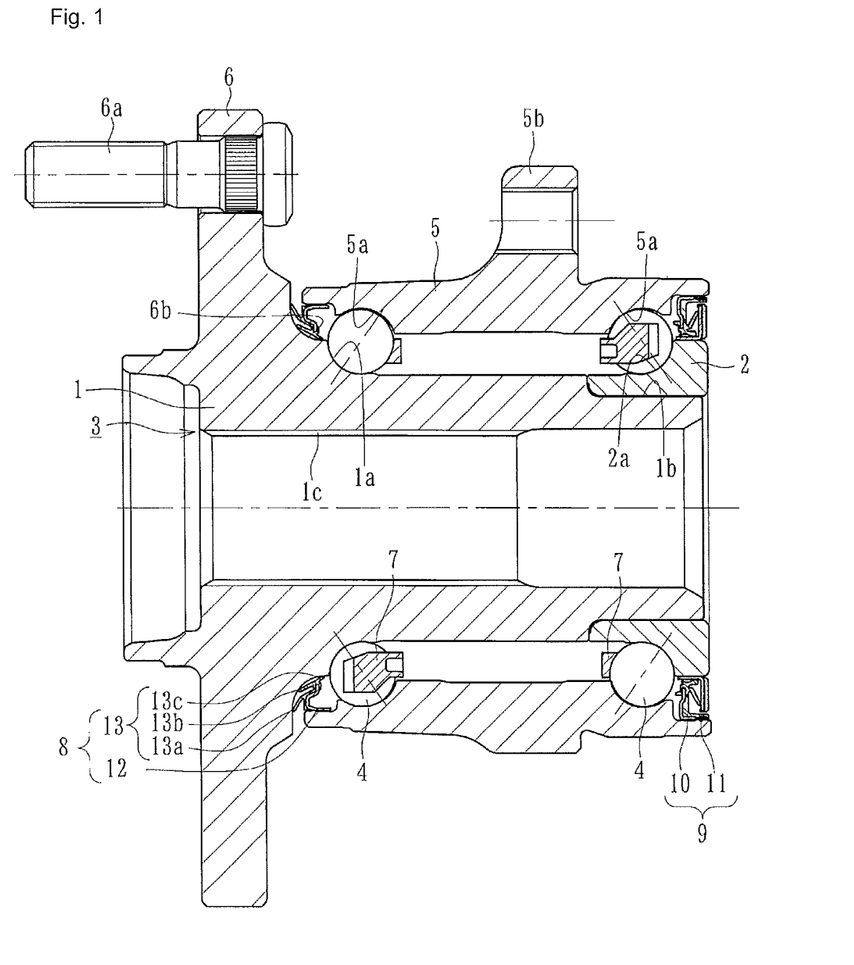
FIG. 1 is a longitudinal section view of one embodiment of a wheel bearing apparatus.
Figures 2A, 2B:
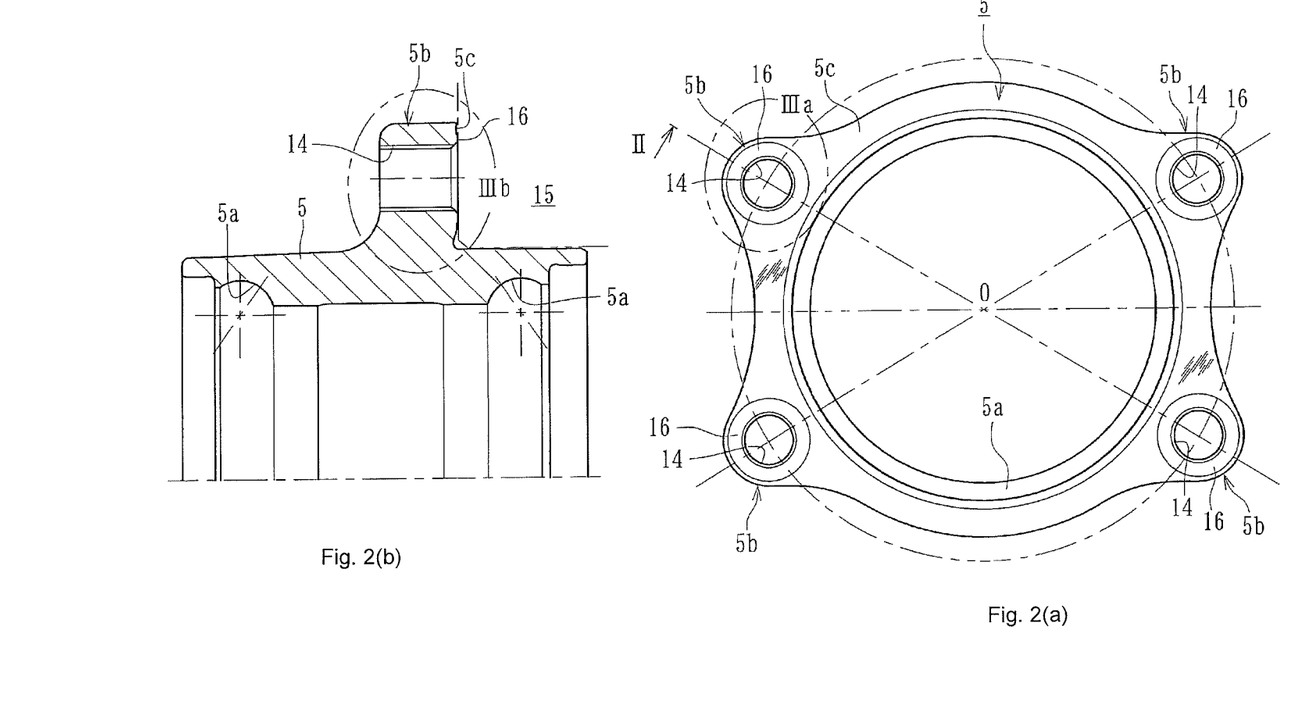
FIG. 2(a) is a side elevation view of the outer member of the wheel bearing apparatus of FIG. 1.
FIG. 2(b) is a longitudinal section view along a line II-O in FIG. 2(a).
Figures 3A, 3B, 3C:
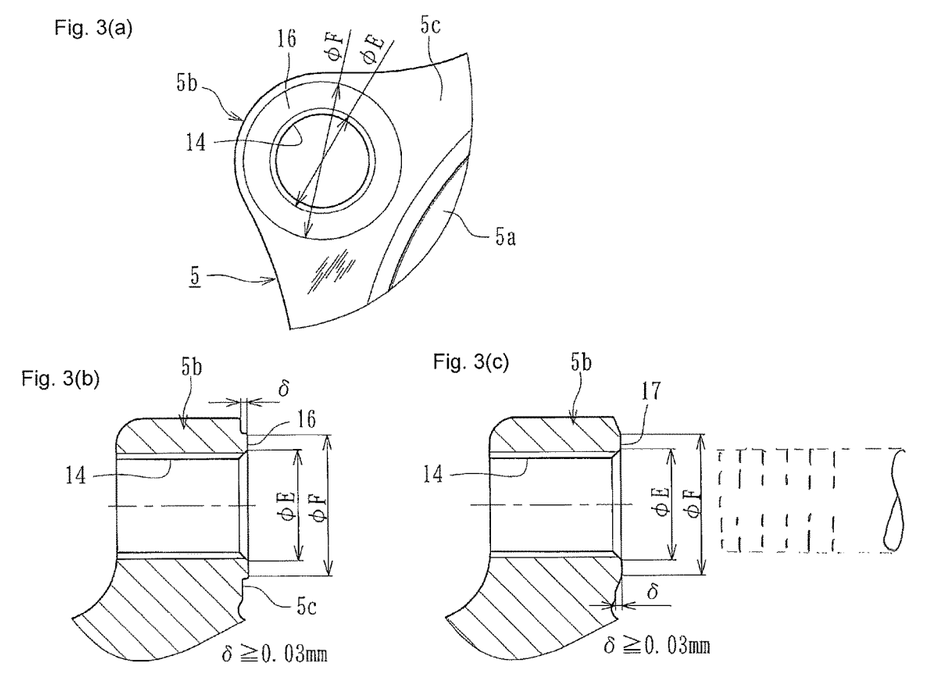
FIG. 3(a) is a partially enlarged view of a region encircled by a line IIIa in FIG. 2(a).
FIG. 3(b) is a partially enlarged view of a portion encircled by a line IIIb in FIG. 2(b).
FIG. 3(c) is a partially enlarged view of a modification of FIG. 2(b).
Figures 4A, 4B:
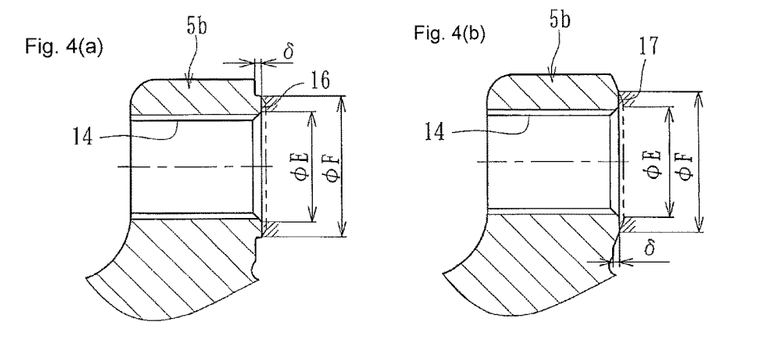
FIG. 4(a) is an explanatory view of a machining method of the portion of FIG. 3(b).
FIG. 4(b) is an explanatory view of a machining method of the modification of FIG. 3(c).
Figure 5A:
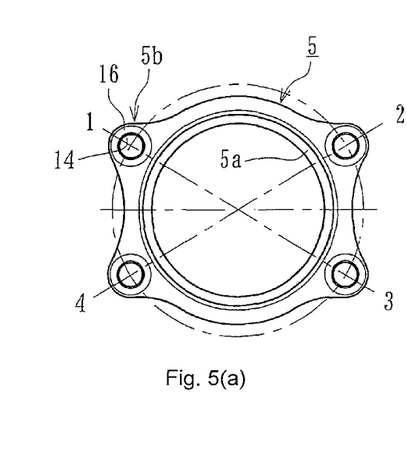
FIG. 5(a) is an explanatory view of measurement positions of the outer member.
Figure 5B:
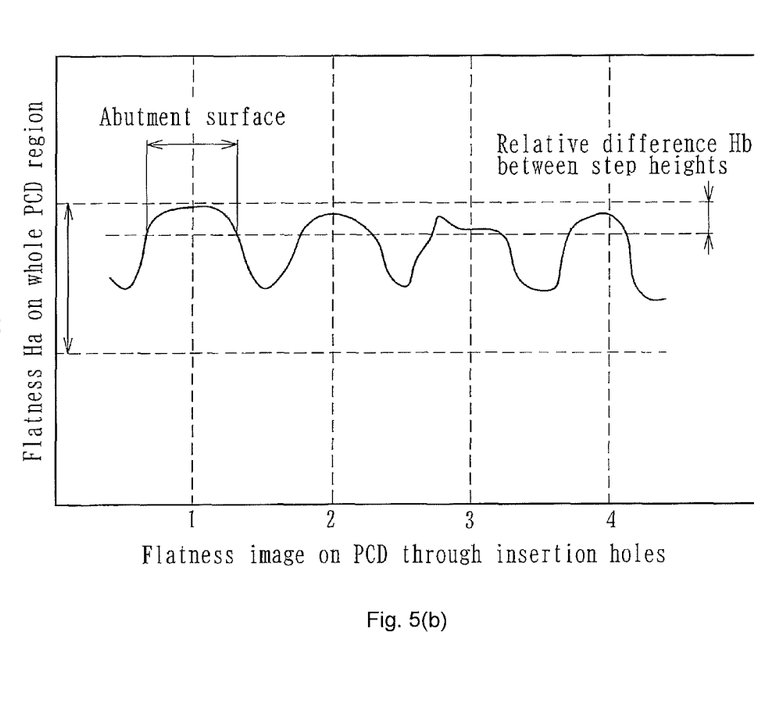
FIG. 5(b) is an image view of the flatness on the pitch circle diameter (PCD) through bolt insertion holes.
Figure 6A:
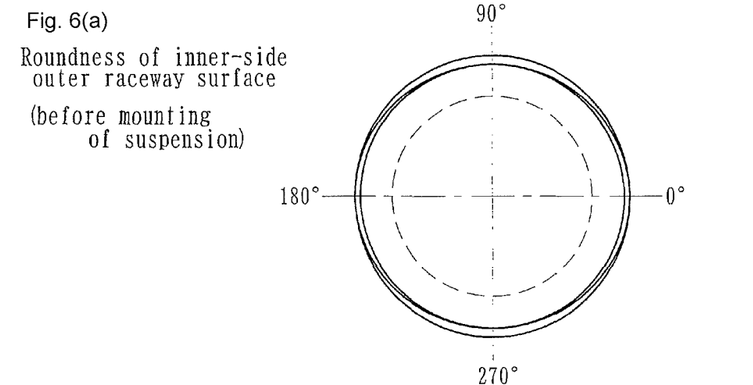
FIG. 6(a) is an explanatory view of the roundness configuration of the outer raceway surface of the inner-side before mounting of the suspension.
Figure 6B:
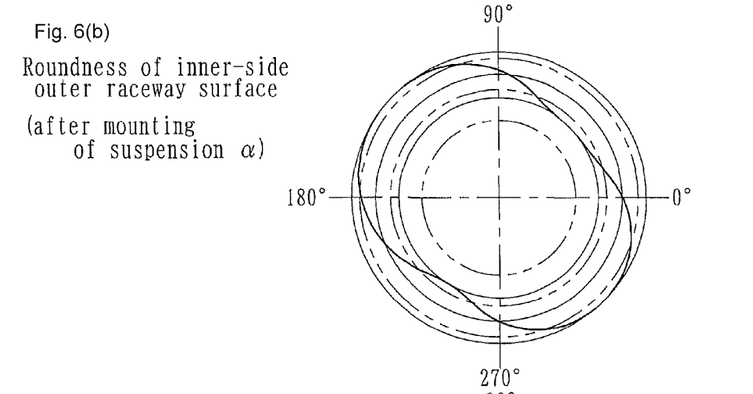
FIG. 6(b) is an explanatory view of the roundness configuration of the outer raceway surface of the inner-side after mounting of the suspension ($\alpha$).
Figure 6C:
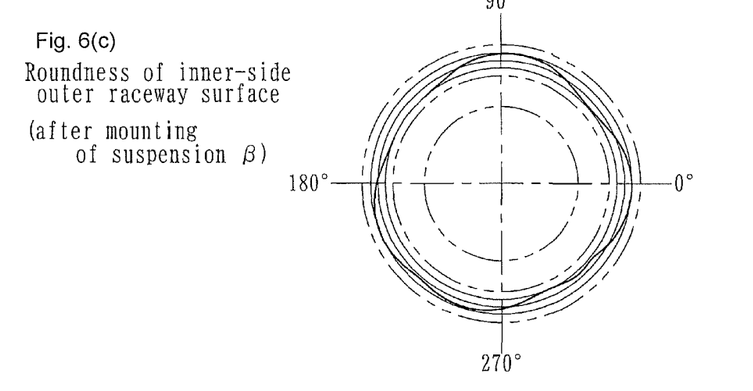
FIG. 6(c) is an explanatory view of the roundness configuration of the outer raceway surface of the inner-side after mounting of the suspension ($\beta$).
Figure 7A:
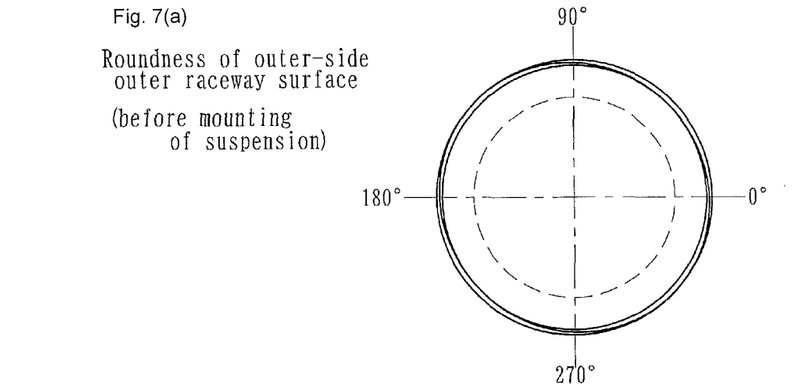
FIG. 7(a) is an explanatory view of the roundness configuration of the outer raceway surface of the outer-side before mounting of the suspension.
Figure 7B:
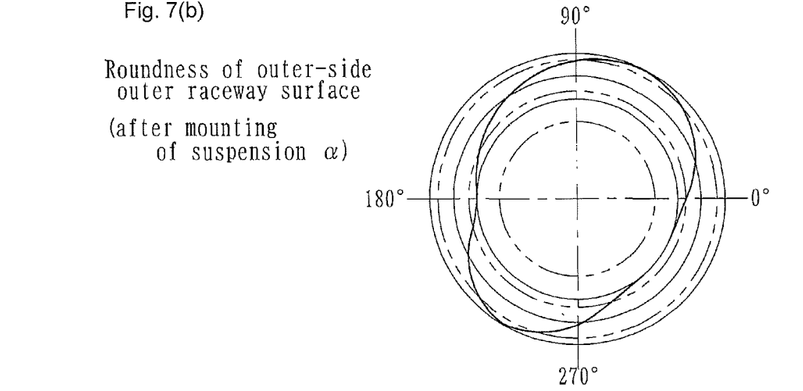
FIG. 7(b) is an explanatory view of the roundness configuration of the outer raceway surface of the outer-side after mounting of the suspension ($\alpha$).
Figure 7C:
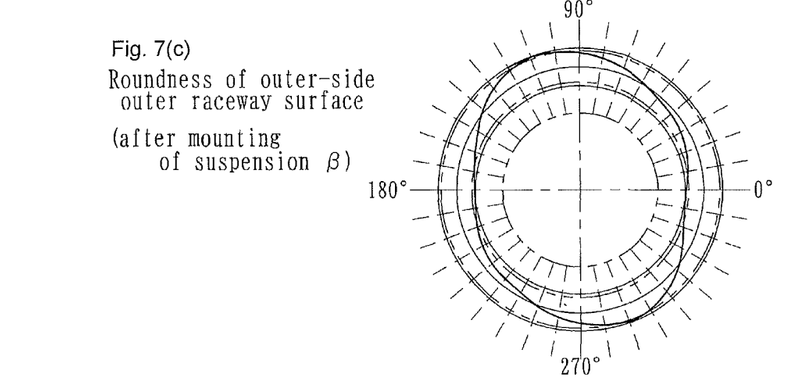
FIG. 7(c) is an explanatory view of the roundness configuration of the outer raceway surface of the outer-side after mounting of the suspension ($\beta$).
Figure 8A:
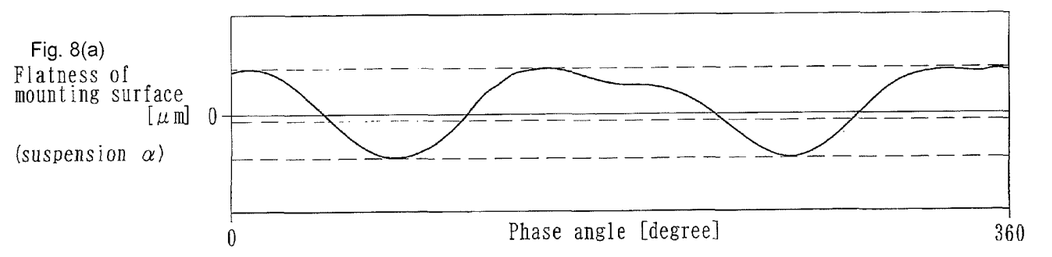
FIG. 8(a) is an explanatory view of the flatness configuration of the mounting surface of the suspension ($\alpha$).
Figure 8B:
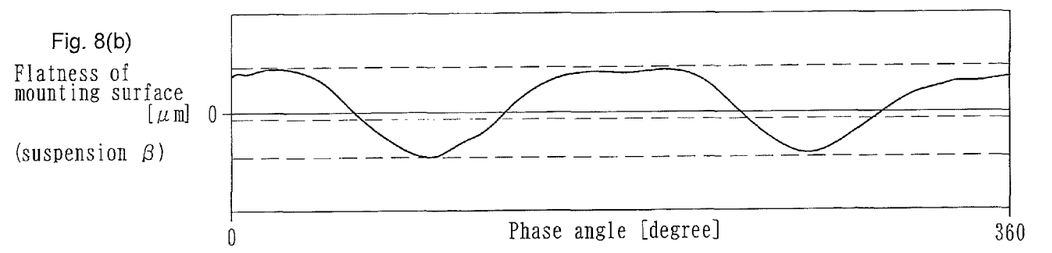
FIG. 8(b) is an explanatory view of the flatness configuration of the mounting surface of the suspension ($\beta$).
Figure 8C:
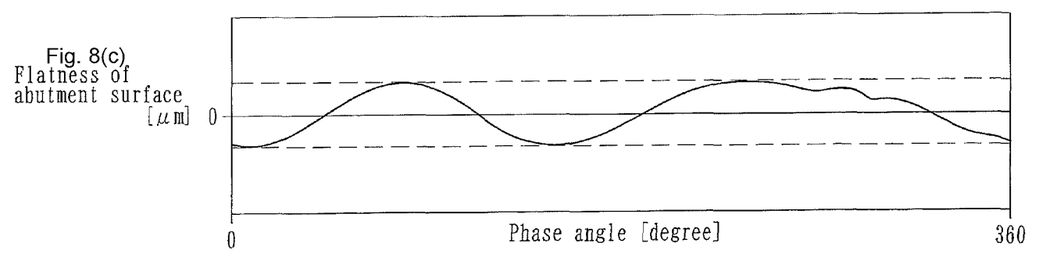
FIG. 8(c) is an explanatory view of the flatness on the pitch circle diameter (PCD) through bolt insertion holes.

Preferred embodiments of the present disclosure will be described with reference to the accompanying drawings. FIG. 1 is a longitudinal section view of one embodiment of the wheel bearing apparatus. FIG. 2(a) is a side elevation view of the outer member of the wheel bearing apparatus of FIG. 1. FIG. 2(b) is a longitudinal section view along a line II-O of FIG. 2(a). FIG. 3(a) is a partially enlarged view of a region encircled by a line IIIa in FIG. 2(a). FIG. 3(b) is a partially enlarged view of a region encircled by a line IIIb in FIG. 2(b). FIG. 3(c) is a partially enlarged view of a modification of FIG. 2(b). FIG. 4(a) is an explanatory view of a machining method of FIG. 3(b). FIG. 4(b) is an explanatory view of a machining method of FIG. 3(c). FIG. 5(a) is an explanatory view of measurement positions of the outer member. FIG. 5(b) is an image view of the flatness on the pitch circle diameter (PCD) through bolt insertion holes. FIG. 6(a) is an explanatory view of the roundness configuration of the outer raceway surface of the inner-side before mounting of the suspension. FIG. 6(b) is an explanatory view of the roundness configuration of the outer raceway surface of the inner-side after mounting of the suspension (α). FIG. 6(c) is an explanatory view of the roundness configuration of the outer raceway surface of the inner-side after mounting of the suspension (β). FIG. 7(a) is an explanatory view of the roundness configuration of the outer raceway surface of the outer-side before mounting of the suspension. FIG. 7(b) is an explanatory view of the roundness configuration of the outer raceway surface of the outer-side after mounting of the suspension (α). FIG. 7(c) is an explanatory view of the roundness configuration of the outer raceway surface of the outer-side after mounting of the suspension (β). FIG. 8(a) is an explanatory view of the flatness configuration of the mounting surface of the suspension (α). FIG. 8(b) is an explanatory view of the flatness configuration of the mounting surface of the suspension (β). FIG. 8(c) is an explanatory view of the flatness on the pitch circle diameter (PCD) through bolt insertion holes. In description of this specification, an outer-side of a bearing apparatus, when it is mounted on a vehicle, is referred to as the "outer-side" (a left-side in a drawing), and an inner-side of a bearing apparatus, when it is mounted on a vehicle, is referred to as the "inner-side" (a right-side in a drawing).

The wheel bearing apparatus shown in FIG. 1 is a so-called "third generation" type for a driving wheel. It includes an inner member 3 with a wheel hub 1 and an inner ring 2 press-fit on the wheel hub 1. An outer member 5 is mounted on the finer member 3, via a double row rolling elements (balls) 4, 4.

The wheel hub 1 is integrally formed, on its outer-side end, with a wheel mounting flange 6. The flange 6 mounts a wheel (not shown). The wheel hub 1 outer circumference includes one (outer-side) inner raceway surface 1a. A cylindrical portion 1b axially extends from the inner raceway surface 1a. A serration (or spline) 1c, for torque transmission, is formed on the inner circumference of the wheel hub 1. Hub bolts 6a are secured on the wheel mounting flange 6 at circumferentially equidistant positions. The inner ring 2 is formed, on its outer circumference, with an inner raceway surface 2a. The inner ring 2 is press-fit, via a predetermined interference, onto the outer circumference of the cylindrical portion 1b of the wheel hub 1.

The wheel hub 1 is made of medium-high carbon steel such as S53C including carbon of 0.40 to 0.80% by weight. It is hardened by high frequency induction hardening to have a surface hardness of 58 to 64 HRC over the inner raceway surface 1a and a region from an inner-side base 6b of the wheel mounting flange 6 to the cylindrical portion 1b. The inner ring 2 is formed from high carbon chrome steel, such as SUJ2. It is dip hardened to its core to have a hardness of 58 to 64 HRC. The rolling elements (balls) 4 are formed from high carbon chrome steel, such as SUJ2. They are dip hardened to their cores to have a hardness of 62 to 67 HRC.

The outer member 5 is formed, on its outer circumference, with body mounting flange 5b adapted to be mounted on a knuckle (not shown) forming part of the suspension. The outer member inner circumference includes double row outer raceway surfaces 5a, 5a opposing the inner raceway surfaces 1a, 2a of the inner member 3. The double row rolling elements 4, 4 are rollably contained between the inner and outer raceway surfaces 1a, 2a and 5a, 5a, respectively, of the inner and outer members 3 and 5, via cages 7.

The outer member 5 is formed of medium-high carbon steel such as S53C including carbon of 0.40 to 0.80% by weight. The outer raceway surfaces 5a, 5a are hardened by high frequency induction hardening to have a surface hardness of 58 to 64 HRC. Seals 8, 9 are mounted on both end openings formed between the outer member 5 and inner member 3. The seals prevent leakage of lubricating grease confined within the bearing and entry of rain water or dust from the outside into the bearing.

The inner-side seal 9 of seals 8, 9 is formed as a so-called pack seal with an annular sealing plate 10 and a slinger 11 oppositely arranged to each other. The sealing plate 10 is press-fit into the inner-side end of the outer member 5, via a predetermined interference. The outer member 5 forms a stator member. The slinger 11 is press-fit onto the inner ring 2, via a predetermined interference. The inner ring 2 forms a rotational member.

The outer-side seal 8 is formed as an integrated seal. The seal 8 includes a metal core 12 press-fit into the outer-side end of the outer member 5. A sealing member 13 adhered to the metal core 12. The metal core 12 is press-formed of austenitic stainless steel sheet (JIS SUS 304 etc.) or preserved cold rolled steel sheet (JIS SPCC etc.). It has a generally annular configuration.

The sealing member 13 is formed of synthetic rubber such as NBR (acrylonitrile-butadiene rubber). It is integrally adhered to the metal core 12 by vulcanizing adhesion. The sealing member 13 includes an integrally formed side lip 13a, dust lip 13b and grease lip 13c. The side lip 13a is inclined radially outward. The dust lip 13b is inclined radially outward, radially inward of the side lip 13a. The grease lip 13c is inclined toward the inner-side.

The inner-side base portion 6b of the wheel mounting flange 6 is formed with a circular arc cross-section. The side lip 13a and the dust lip 13b slidably contact the base portion 6b, via a predetermined axial interference. The grease lip 13c also slidably contacts the base portion 6b, via a predetermined radial interference. There are examples of material of sealing member 13 other than NBR such as HNBR (hydrogenation acrylonitric-butadiene rubber), EPDM (ethylene propylene rubber), ACM (poly-acrylic rubber) superior in heat and chemical resistance, FKM (fluororubber) or silicone rubber.

Although shown here as a wheel bearing apparatus formed by a double row angular contact ball bearing using balls as the rolling elements 4, the present disclosure is not limited to such a bearing and may be a double row tapered roller bearing using tapered rollers as the rolling elements 4. In addition, although shown here as a third generation type bearing with the inner raceway surface 1a is directly formed on the outer circumference of the wheel hub 1, the present disclosure can be applied to second generation type bearings where a pair of inner rings are press-fit onto the cylindrical portion, or to fourth generation type bearings where an inner raceway surface is directly formed on an outer circumference of an outer joint member of a constant velocity universal joint (not shown).

As shown in FIG. 2(a), a plurality of (four in the illustrated embodiment) bolt insertion holes 14 are formed in the body mounting flange 5b of the outer member 5. An abutment surface 16, to abut against a body-side member, knuckle or suspension plate 15, is formed around each bolt insertion hole 14 as shown in FIG. 2(b). Thus, it is illustrated as a surface projecting from the inner-side surface 5c of the body mounting flange 5b with having a step height δ (see FIGS. 3 and 4). As shown in the enlarged view of FIG. 3(a), the abutment surface 16 functions to limit abutment portions necessary for a fastening minimum and to reduce adverse influences affected by the flatness of the abutment surface 16 against the knuckle 15. More particularly, the inner diameter E of the abutment surface 16 is set to a smallest inner diameter, an opening diameter of the bolt insertion hole 14. The outer diameter F, of the abutment surface 16, is set to 1.4 to 1.7 times, preferably 1.5 to 1.6 times the outer diameter of a fastening bolt (not shown). The outer diameter of the fastening bolt is readily obtained by the threaded diameter of the insertion hole 14. In this case, if the outer diameter F, of the abutment surface 16, is set to less than 1.4 times the outer diameter of a fastening bolt, the contact area of the abutment surface of the body mounting flange 5b will be too small and thus the contact surface pressure would be too large. On the contrary, if the outer diameter F, of the abutment surface 16, is set to larger than 1.7 times the outer diameter of a fastening bolt, the flatness of the abutment surface to be abutted against the knuckle 15 may adversely affect and thus the deformation of the outer member 5 after its mounting could not be effectively suppressed.

The step height δ of the abutment surface 16 is formed by machining (turning process) after heat treatment (high frequency hardening) of the outer member 5. This corrects the heat treatment deformation and thus limits a relative difference Hb (see FIG. 5) between the step heights δ. As shown in FIG. 3(b), the step height δ of the abutment surface 16 is set as δ≥0.03 mm. If the step height δ is less than 0.03 mm, the step height δ would be deformed and lost at a maximum standard value of fastening torque of the fastening bolts due to the on-desk calculation (FEM analysis). The machining of the abutment surface 16 may be performed by grinding in place or turning. This makes it possible to correct accuracy deterioration due to heat treatment deformation and thus to finish the abutment surface 16 at a higher accuracy.

FIG. 3(c) shows a modification of the abutment surface 16 of FIG. 3(b). In this modification, an abutment surface 17 is formed. It projects around the bolt insertion hole 14 to have a truncated cone cross-section. This suppresses deformation of the step height when fastening securing bolts at a predetermined fastening torque are secured.

FIG. 4 is an explanatory view of a machining method of the abutment surfaces 16, 17. FIG. 4(a) and FIG. 4(b) show the abutment surfaces 16 and 17, respectively. In these figures, two-dot chain lines show configurations after forging (before turning). The abutment surfaces 16, 17 have the step height δ and can be formed by turning the portions shown by hatchings.

The abutment surface 16, to abut against the body-side member (e.g. knuckle) 15, is formed around each bolt insertion hole 14, as a surface projecting from the inner-side surface 5c of the body mounting flange 5b with a step height δ. Thus, it is possible, after mounting, to suppress adverse influence of deformation of the body mounting flange on the roundness of the outer member outer raceway surfaces by preparing the relative difference Hb, of the step height δ of the abutment surface 16, small even though the flatness Ha on whole PCD region Ha through the bolt insertion hole 14 is inexact as shown in FIG. 5.

According to a test performed by the applicant, the roundness of the outer raceway surface after mounting of the wheel bearing apparatus on a suspension of a vehicle, the roundness of the inner-side outer raceway surface was 7.0 μm and 3.0 μm and the roundness of the outer-side outer raceway surface was 6.0 μm and 5.5 μm relative to the roundness before mounting of wheel bearing was 1.5 μm as shown in Table 1 below. These results satisfy the decision criteria.

In this test, the same bearings were used in both left and right suspensions. The flatness on the PCD through the bolt insertion holes 14 was 10 μm, the flatness of the bearing mounting surface of the suspensions was 140 μm on a suspension α and 130 μm on a suspension β. In addition, the plate thickness of the knuckle (i.e. back plate of steel) was 2.30 to 2.34 mm and the difference of the plate thickness was 20 to 40 μm.

TABLE 1

| Test condition | Roundness of outer raceway surface (μm) Before mount/After mount | | Relative difference between step heights of abutment surfaces (μm) |
|---|---|---|---|
| | Inner side | Outer side | |
| Suspension α | 1.5/7 | 1/6 | Max. 80 |
| Suspension β | 1.5/3 | 1/5.5 | Max. 40 |

FIGS. 6(a) to 6(c) and FIGS. 7(a) to 7(c) show the roundness configuration and FIGS. 8(a) to 8(c) shows the flatness configuration. FIG. 6 shows the roundness of the inner-side outer raceway surface and FIG. 7 shows the roundness of the outer-side outer raceway surface. FIG. 7(a) shows the roundness of the outer raceway surface before mounting on the suspension. FIG. 7(b) shows the roundness of the outer raceway surface after mounting on the suspension (α). FIG. 7(c) shows the roundness of the outer raceway surface after mounting on the suspension (β). In addition, FIG. 8(a) shows the flatness configuration of the mounting surface of the suspension (α). FIG. 8(b) shows the flatness configuration of the mounting surface of the suspension (β). FIG. 8(c) shows the flatness configuration of the abutment surface on the PCD through the bolt insertion holes of the body mounting flange of the outer member. The measurement of the roundness was performed using a measuring instrument Talyrond 365 manufactured by Ametek, Inc. The measurement of the flatness was performed using a 3-dimension measuring instrument manufactured by Mitutoyo Corporation.

In the right and left suspensions, their flatness and the relative difference Hb between the step heights δ of the mounting surface are different from each other. Accordingly, the roundness configuration of the outer raceway surfaces after mounting of the bearing are also different (see FIGS. 6 and 7) due to the configurations of the mounting surfaces and the relative difference Hb between the step heights δ of the mounting surface (see FIG. 8). On the other hand as shown in Table 1, the relative difference Hb between the step heights δ of the mounting surface 16 of the bearing used h the suspension (α)was max. 80 μm. The relative difference Hb between the step heights δ of the mounting surface 16of the bearing used in the suspension β was max. 40 μm. From these results, it is found that it is possible to satisfy the decision criteria able to suppress adverse influence affected by the flatness of the mating member (e.g. knuckle) and the deformation of the outer member 5after its mounting by limiting the relative difference Hb between the step heights δ of the mounting surface 16 of the bearing less than 80 μm, preferably 40 μm.

Figure 9A:
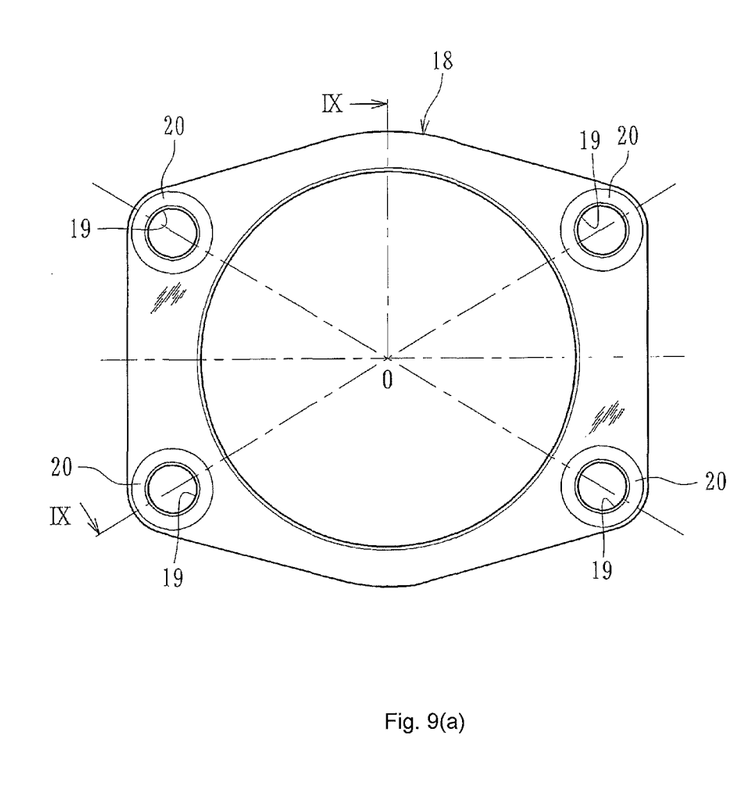
FIG. 9(a) is a side elevation view of a suspension plate of the mounting structure according to a second embodiment.
Figure 9B:
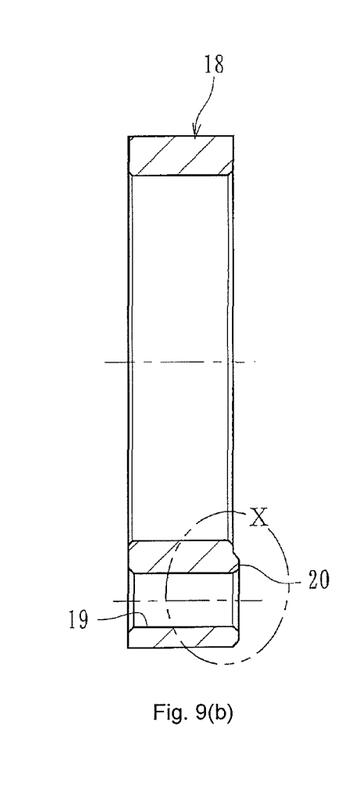
FIG. 9(b) is a cross-section view of the suspension plate taken along a line IX-O-IX of FIG. 9(a).
Figure 10A:
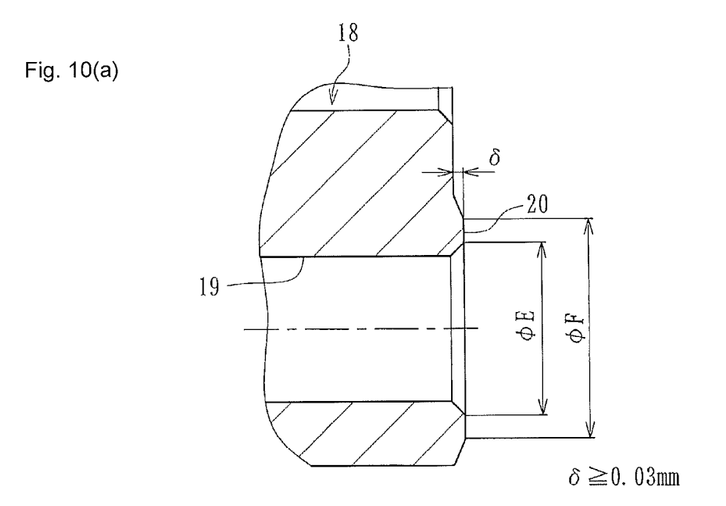
FIG. 10(a) is a partially enlarged view of a part shown by a circle X in FIG. 9(b).
Figure 10B:
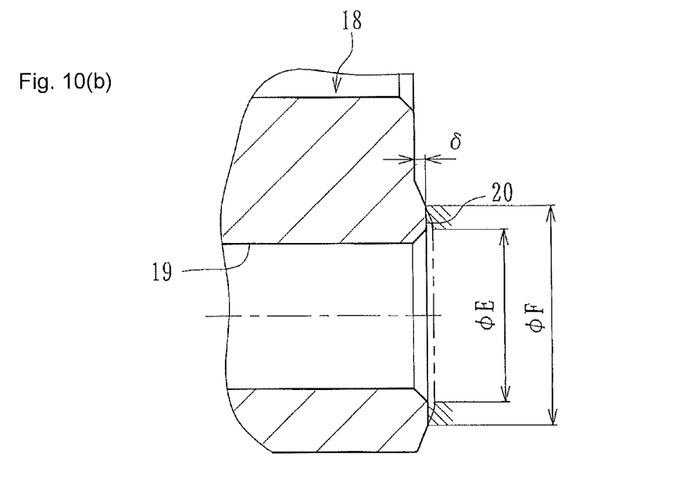
FIG. 10(b) is an explanatory view of a machining method of a step height of FIG. 10(a).

FIG. 9 shows a suspension plate 18used for the mounting structure of the wheel bearing apparatus of a second embodiment of the present disclosure. FIG. 9(a) is a side elevation view of the suspension plate 18. FIG. 9(b) is a cross-section view of the suspension plate 18taken along a line IX-O-IX of FIG. 9(a). FIG. 10(a) is a partially enlarged view of a part shown by a circle X in FIG. 9(b). FIG. 10(b) is an explanatory view of the machining method of the step height of FIG. 10(a).

As shown in FIG. 9(b), an abutment surface 20of the suspension plate 18,to abut against a bearing-side abutment surface, is formed around each bolt insertion hole 19as a surface projecting from the bearing-side surface of the suspension plate 18 with a step height δ and a truncated cone cross-section. As shown in the partially enlarged view of FIG. 10(a), the abutment surface 20of the suspension plate 18is able to reduce the influence of the flatness of the abutment surfaces between the bearing apparatus and the mating member (e.g. knuckle) by suppressing a minimum of the abutment area necessary for fastening of the bearing apparatus.

As shown in FIG. 10(b), a two-dot line shows a configuration after stamping. The abutment surface 20,with the step height δ is formed by turning portions shown by the hatchings.

As described above, it is possible to suppress deterioration of the roundness of the outer raceway surfaces 5a, 5a of the outer member 5 by forming the abutment surface 20with the step height δ on the bearing-side abutment surface of the suspension plate 18.In this case, it is possible to further reduce the influence of the flatness of the abutment surface on the roundness of the outer raceway surfaces by combining the abutment surface 20of the suspension plate 18with the body mounting flange 5b, formed with the abutment surface 16or 17.

The present disclosure can be applied to a wheel bearing apparatus of the second, third or fourth generation type.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
   an outer member integrally formed with a body mounting flange on its outer circumference, the body mounting flange to be mounted on a body-side member of a vehicle, the outer member inner circumference includes double row outer raceway surfaces;
   an inner member, on its outer circumference, includes double row inner raceway surfaces opposing the double row outer raceway surfaces; and
   double row rolling elements are contained between the inner raceway surfaces and the outer raceway surfaces, respectively, of the inner member and the outer member;
   a plurality of bolt insertion holes are formed in the outer member body mounting flange;
   an abutment surface, to abut against the body-side member, is formed to surround each bolt insertion hole as a surface, having a desired width and an overall circular configuration, projecting from the inner-side surface of the body mounting flange with a step height (δ); and
   a relative difference (Hb) between the step heights (δ) of the abutment surfaces is limited to a minimum of 80 μm or less.

2. The wheel bearing apparatus of claim 1, wherein the inner diameter of the abutment surface is an opening diameter of the bolt insertion hole and the outer diameter of the abutment surface is set to 1.4 to 1.7 times the outer diameter of a fastening bolt.

3. The wheel bearing apparatus of claim 1, wherein the step height (δ) of the abutment surface is set to 0.03 mm or more.

4. The wheel bearing apparatus of claim 1, wherein the step heights (δ) of the abutment surface are formed by machining after heat treatment.

5. A mounting structure for a wheel bearing apparatus comprising:
   a wheel bearing apparatus comprising an outer member integrally formed, on its outer circumference, with a body mounting flange to be mounted on a body-side member of a vehicle, the outer member inner circumference includes double row outer raceway surfaces, an inner member, on its outer circumference, includes double row inner raceway surfaces opposing the double row outer raceway surfaces, double row rolling elements are contained between the inner raceway surfaces and the outer raceway surfaces, respectively, of the inner member and the outer member; and
   a mounting member interposed between the body mounting flange of the outer member and the body-side member;
   a plurality of bolt insertion holes are formed in the outer member body mounting flange and a plurality of bolt insertion holes are formed in the mounting member;
   an abutment surface, to abut against the body mounting flange, is formed to surround each bolt insertion hole of the mounting member as a surface, having a desired width and an overall circular configuration, projecting from the outer-side surface of the mounting member with a step height ($\delta$); and relative difference (Hb) between the step heights ($\delta$) of the abutment surfaces is limited to a minimum of 80 μm or less.

6. The mounting structure for the wheel bearing apparatus of claim 5, wherein the inner diameter of the abutment surface is an opening diameter of the bolt insertion hole and the outer diameter of the abutment surface is set to 1.4 to 1.7 times the outer diameter of a fastening bolt.

7. The mounting structure for the wheel bearing apparatus of claim 5, wherein the step height ($\delta$) of the abutment surface is set to 0.03 mm or more.

8. The mounting structure for the wheel bearing apparatus of claim 5, wherein the step heights ($\delta$) of the abutment surface are formed by machining after heat treatment.

* * * * *

UNITED STATES PATENT AND TRADEMARK OFFICE
CERTIFICATE OF CORRECTION

PATENT NO. : 10,174,786 B2
APPLICATION NO. : 15/619642
DATED : January 8, 2019
INVENTOR(S) : Hisao Ishiguro et al.

It is certified that error appears in the above-identified patent and that said Letters Patent is hereby corrected as shown below:

In the Specification

Column 2
Line 12  delete "knuckle55when" and insert --knuckle 55 when--
Line 13  delete "knuckle55is" and insert --knuckle 55 is--
Line 28  delete "70.Mounting" and insert --70. Mounting--
Line 40  delete "74is" and insert --74 is--
Line 65  delete "69of" and insert --69 of--
Line 67  delete "75.Thus," and insert --75. Thus,--

Column 3
Line 8  delete "75a" and insert --75--

Column 7
Line 25  delete "1is" and insert --1 is--
Line 67  delete "3with" and insert --3 with--
Line 67  delete "1and" and insert --1 and--

Column 8
Line 1  delete "2press-fit" and insert --2 press-fit--
Line 1  delete "1.An" and insert --1. An--
Line 1  delete "5is" and insert --5 is--
Line 2  delete "finer" and insert --inner--
Line 2  delete "3,via" and insert --3, via--
Line 4  delete "1is" and insert --1 is--
Line 8  delete "lb" and insert --1b--
Line 16  delete "lb" and insert --1b--
Line 23  delete "6to" and insert --6 to--.
Line 24  delete "2is" and insert --2 is--
Line 25  delete "SUJ2.It" and insert --SUJ2. It--

Signed and Sealed this
Eighteenth Day of June, 2019

Andrei Iancu
*Director of the United States Patent and Trademark Office*

| | |
|---|---|
| Line 26 | delete "4are" and insert --4 are-- |
| Line 29 | delete "5is" and insert --5 is-- |
| Line 37 | delete "3and 5, via" and insert --3 and 5, via-- |
| Line 38 | delete "5is" and insert --5 is-- |
| Line 42 | delete "9are" and insert --9 are-- |
| Line 49 | delete "11oppositely" and insert --11 oppositely-- |
| Line 51 | delete "5forms" and insert --5 forms-- |
| Line 53 | delete "2,via" and insert --2, via-- |
| Line 55 | delete "8is" and insert --8 is-- |
| Line 56 | delete "12press-fit" and insert --12 press-fit-- |
| Line 57 | delete "13adhered" and insert --13 adhered-- |
| Line 58 | delete "12.The" and insert --12. The-- |
| Line 58 | delete "12is" and insert --12 is-- |
| Line 62 | delete "13is" and insert --13 is-- |
| Line 64 | delete "12by" and insert --12 by-- |

Column 9

| | |
|---|---|
| Line 19 | delete "4.In" and insert --4. In-- |
| Line 21 | delete "1,the" and insert --1, the-- |
| Line 31 | delete "16,to" and insert --16, to-- |
| Line 40 | delete "16against" and insert --16 against-- |
| Line 40 | delete "15.More" and insert --15. More-- |
| Line 41 | delete "16is" and insert --16 is-- |
| Line 43 | delete "14.The" and insert --14. The-- |
| Line 44 | delete "1.4to 1.7 times," and insert --1.4 to 1.7 times,-- |
| Line 44 | delete "1.5to 1.6 times" and insert --1.5 to 1.6 times-- |
| Line 47 | delete "14.In" and insert --14. In-- |
| Line 48 | delete "16,is" and insert --16, is-- |
| Line 53 | delete "16,is" and insert --16, is-- |
| Line 58 | delete "16is" and insert --16 is-- |
| Line 60 | delete "5.This" and insert --5. This-- |
| Line 63 | delete "16is" and insert --16 is-- |

Column 10

| | |
|---|---|
| Line 1 | delete "16may" and insert --16 may-- |
| Line 4 | delete "16at" and insert --16 at-- |
| Line 6 | delete "16of" and insert --16 of-- |
| Line 7 | delete "17is" and insert --17 is-- |
| Line 13 | delete "16and 17,respectively" and insert --16 and 17, respectively-- |
| Line 15 | delete "17have" and insert --17 have-- |
| Line 18 | delete "16.to" and insert --16, to-- |
| Line 19 | delete "15,is" and insert --15, is-- |
| Line 27 | delete "14,is" and insert --14, is-- |
| Line 42 | delete "β.In" and insert --β. In-- |

CERTIFICATE OF CORRECTION (continued)
U.S. Pat. No. 10,174,786 B2

Column 11
Line 20                        delete "h" and insert --in--
Line 21                        delete "(α)was" and insert --(α) was--
Line 22                        delete "16of" and insert --16 of--
Line 27                        delete "5after" and insert --5 after--
Line 31                        delete "18used" and insert --18 used--
Line 35                        delete "18taken" and insert --18 taken--
Line 40                        delete "20of" and insert --20 of--
Line 41                        delete "18,to" and insert --18, to--
Line 42                        delete "19as" and insert --19 as--
Line 46                        delete "20of" and insert --20 of--
Line 47                        delete "18is" and insert --18 is--
Line 53                        delete "20,with" and insert --20, with--
Line 58                        delete "20with" and insert --20 with--
Line 60                        delete "18.In" and insert --18. In--
Line 63                        delete "20of" and insert --20 of--
Line 63                        delete "18with" and insert --18 with--
Line 65                        delete "16or" and insert --16 or--

In the Claims

Column 13
Line 2, Claim 5                delete "outer- side" and insert --outer-side--